US009159296B2

(12) United States Patent
McAllister et al.

(10) Patent No.: US 9,159,296 B2
(45) Date of Patent: Oct. 13, 2015

(54) SYNCHRONIZING VIEWS DURING DOCUMENT PRESENTATION

(75) Inventors: Heidi McAllister, Brier, WA (US); Po Yan Tsang, Seattle, WA (US); Chad Nedziek, Redmond, WA (US); Ning Jiang, Bellevue, WA (US); Kenneth Mui, Bellevue, WA (US); Subalakshmi Venugopal, Bellevue, WA (US); Eric Bailey, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 541 days.

(21) Appl. No.: 13/548,149

(22) Filed: Jul. 12, 2012

(65) Prior Publication Data

US 2014/0019858 A1    Jan. 16, 2014

(51) Int. Cl.
| | |
|---|---|
| G06F 3/00 | (2006.01) |
| G09G 5/02 | (2006.01) |
| G09G 5/14 | (2006.01) |
| G06F 3/0481 | (2013.01) |
| G06F 17/30 | (2006.01) |

(52) U.S. Cl.
CPC ............... *G09G 5/026* (2013.01); *G09G 5/14* (2013.01); *G06F 3/0481* (2013.01); *G06F 17/30873* (2013.01); *G09G 2340/14* (2013.01); *G09G 2340/145* (2013.01); *G09G 2354/00* (2013.01)

(58) Field of Classification Search
USPC ........................................................ 715/730
See application file for complete search history.

(56) References Cited

U.S. PATENT DOCUMENTS

| 7,058,891 | B2 | 6/2006 | O'Neal et al. | |
| 8,150,920 | B2* | 4/2012 | Forstadius | 709/205 |
| 2002/0186236 | A1 | 12/2002 | Brown et al. | |
| 2002/0198941 | A1* | 12/2002 | Gavrilescu et al. | 709/205 |
| 2003/0009524 | A1 | 1/2003 | Kenoyer et al. | |
| 2003/0179230 | A1* | 9/2003 | Seidman | 345/750 |
| 2003/0191805 | A1* | 10/2003 | Seymour et al. | 709/204 |
| 2006/0070001 | A1 | 3/2006 | Liu et al. | |
| 2007/0038945 | A1* | 2/2007 | Miller et al. | 715/760 |
| 2008/0052357 | A1 | 2/2008 | Branson et al. | |
| 2008/0091778 | A1 | 4/2008 | Ivashin et al. | |
| 2008/0288890 | A1 | 11/2008 | Anderson et al. | |
| 2009/0327899 | A1 | 12/2009 | Bress et al. | |
| 2010/0169951 | A1* | 7/2010 | Vaughan et al. | 715/730 |
| 2011/0078560 | A1* | 3/2011 | Weeldreyer et al. | 715/255 |
| 2011/0123972 | A1 | 5/2011 | Friedman | |

OTHER PUBLICATIONS

Berena, et al., "Shared Virtual Presentation Board for e-Communication on the WebELS Platform", Retrieved at <<http://www.icce2010.upm.edu.my/papers/c3/short%20paper/C3SP99.pdf>>, Proceedings of the 18th International Conference on Computers in Education. Putrajaya, Malaysia:Asia-Pacific Society for Computers in Education, Nov. 29, 2010, pp. 1-5.

* cited by examiner

*Primary Examiner* — Dino Kujundzic
(74) *Attorney, Agent, or Firm* — Steve Crocker; Jim Ross; Micky Minhas

(57) ABSTRACT

An application synchronizes views during document presentation. The application detects a selection of a section of a portion of presented content at a presenter view. The application shifts the portion of the content displayed at an attendee view to bring to focus the selection. Alternatively, the application displays the selection in a pop-out view pane within the attendee view to bring to focus the selection. The application also shifts content in the attendee view according to an offset ratio calculated from comparing a non-displayed section of a page of the document and a displayed section of a page of the document within the presenter view.

20 Claims, 9 Drawing Sheets

SYNCHRONIZING VIEWS DURING DOCUMENT PRESENTATION

BACKGROUND

Increasingly documents and other digital content are being shared over the Internet or other similar private networks. Typically, a presenter initiates an online meeting with one or more other users, and generates content, which the presenter may desire to share with one or more attendees of an online meeting. In a typical online meeting, shared content is transmitted from the presenter (usually through a server) to the attendees similar to a video stream, where the flow of presentation is controlled by the presenter. Thus, attendees have a passive role of viewing the presented material at the presenter's pace and direction.

In modern systems, a presentation attendee may have different screen resolution from a presenter's. In addition, presentation viewing size may also differ from the presenter's. As a result, attendee may not see a duplicate view of the presenter's. Modern solutions attempt to resolve attendee off synchronicity issues with screen-sharing technologies. Differing screen resolutions are resolved by the attendee zooming in or zooming out of a presentation. Alternatively, scrollbars may be utilized when a presenter view does not fit within attendee's resolution. Current solutions may enable an attendee to see what the presenter sees. However for presentations, particularly text-rich presentations, zooming in or zooming out may make it difficult to read the text because the text may become too small or too big to read. In a scrollbar approach, attendee may have to manually scroll which may interrupt flow of a presentation. In addition, the attendee may not see what the presenter is focusing. Screen sharing also does not support allowing the attendee to navigate the document on their own.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to synchronizing views during document presentation. An application according to embodiments may detect content displayed in a presenter view. The content may be part of a document including text, graphics, images, sound, video, etc. The application may display the content in an attendee view. The attendee view may be constrained by attendee device limitations such as limited screen area, resolution, etc. . . . Next, the application may determine a selection of the content in focus within the presenter view. The selection may come into focus through a presenter action such as a select action. Subsequently, the application may synchronize the content displayed in the attendee view to bring to focus the selection within the attendee view.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
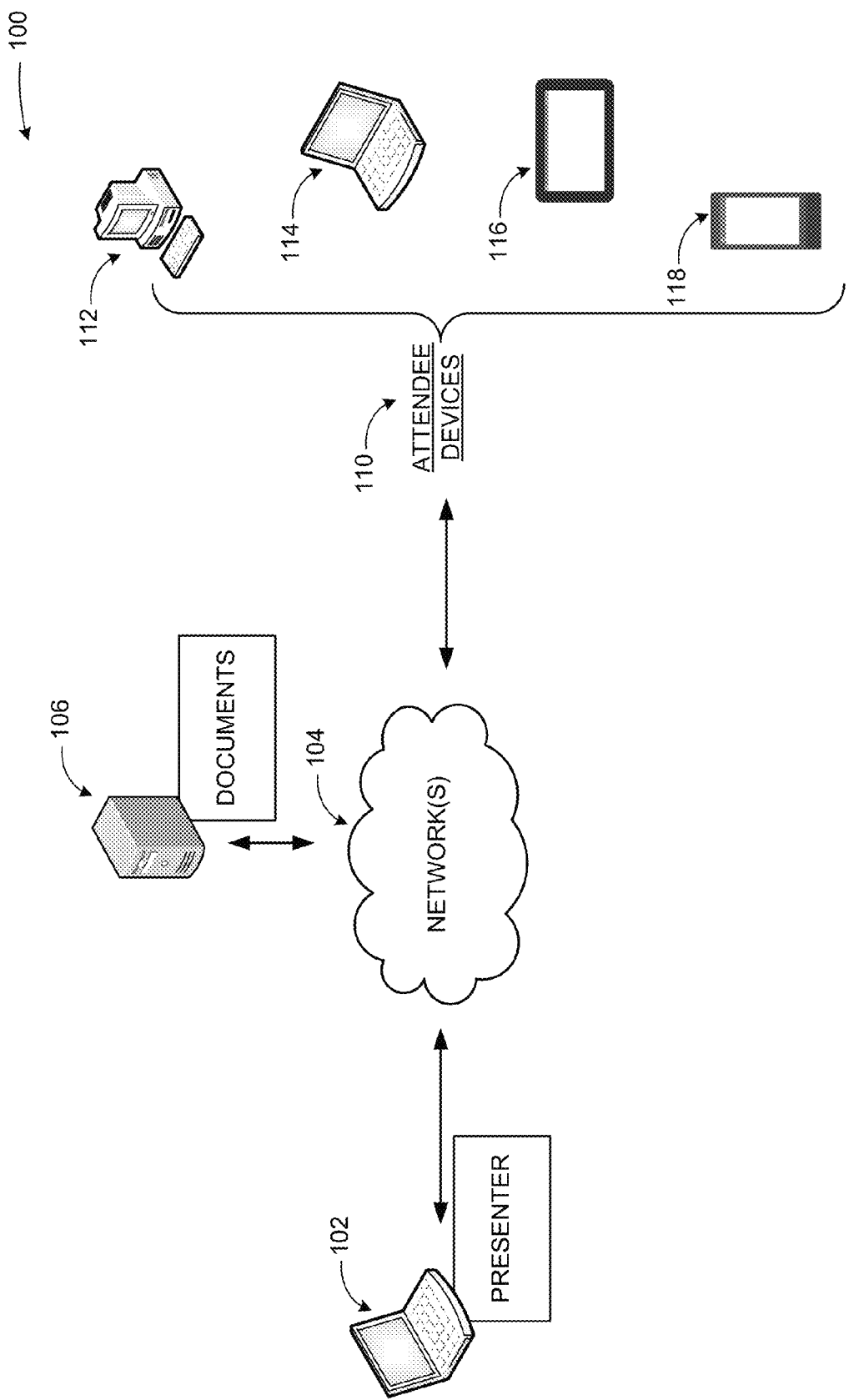
FIG. 1 illustrates an example network diagram where an application may synchronize views during document presentation according to some embodiments.

As briefly described above, an application may synchronize views during document presentation. The application may detect content displayed in a presenter view and display the content in an attendee view. The application may determine a selection of the content in focus within the presenter view and synchronize the content displayed in the attendee view to bring to focus the selection.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a non-transitory computer-readable memory device. The computer-readable storage medium can for example be implemented via one or more of a volatile computer memory, a non-volatile memory, a hard drive, a flash drive, a floppy disk, or a compact disk, and comparable media.

According to embodiments, a presenter may illustrate a document to one or more attendees during a presentation facilitated by an application such as a presentation application. The presentation may be done locally or remotely. In a local setting, a document may be shown by the presenter through a client of the presentation application on the attendee device(s). The presentation application may provide user interfaces (UI) called views on presenter and attendee devices. The views may or may not have similar specifications such as similar or different screen resolutions. The presentation application may display the presenter document through presenter and attendee views. In remote settings, the attendee client of the presentation application may receive content from presenter client of the presentation application to synchronize views through devices that are connected to external network(s) facilitating communications.

Throughout this specification, the term "platform" may be a combination of software and hardware components for synchronizing views during document presentation. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below. The "application" as referred to herein is not intended to just be a web-service, but it may also be a combination of the presenter (e.g., a rich client and a web application/script code), a web service, and/or an attendee (e.g., a web application and/or script code), for example.

Referring to FIG. 1, diagram 100 illustrates an example network diagram where an application may synchronize views during document presentation according to some embodiments. The components and environments shown in diagram 100 are for illustration purposes. Embodiments may be implemented in various local, networked, cloud-based and similar computing environments employing a variety of computing devices and systems, hardware and software.

In an example environment illustrated in diagram 100, a presenter may share a document with attendee(s) through a presenter device 102. The presenter device 102 may be a variety of devices including a laptop computer, a desktop computer, a smart phone, a slate device, etc. The presenter device 102 may execute an application sharing the document with attendee(s) through network(s) 104. Network(s) 104 may include wired and wireless network platforms.

In an example embodiment, the presenter may share the document through a document service such as a service hosted on server 106. An application presenting a document to attendee(s) may retrieve or store the document through documents server 106. Additionally, the application may synchronize the document presented by the presenter with an attendee view in attendee devices 110. The attendee devices may span a variety of hardware including a desktop computer 112, a laptop computer 114, a slate device 116, and a smart phone 118.

Figure 2:
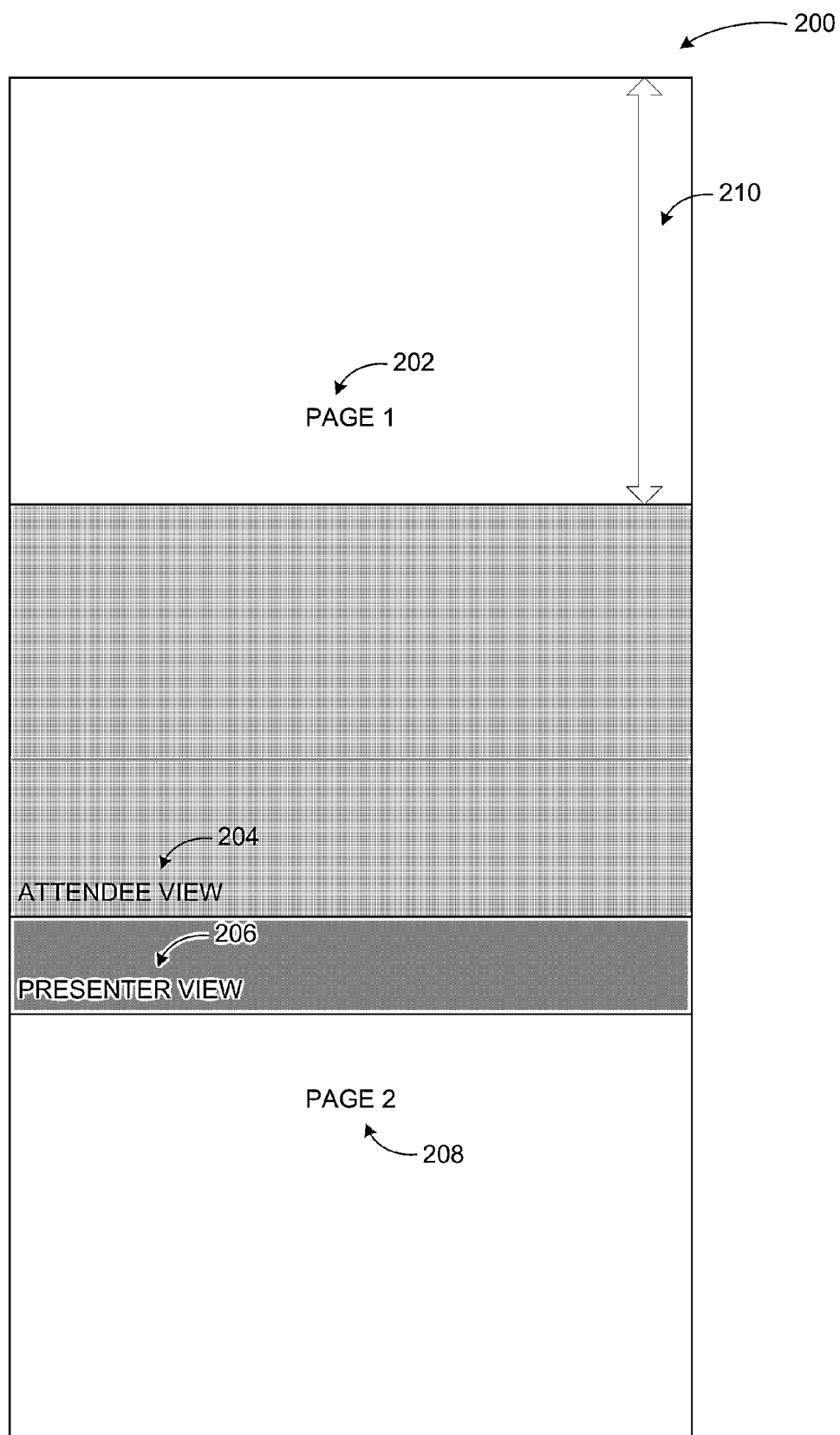
FIG. 2 illustrates an example scenario in which an application may synchronize views during document presentation according to embodiments.

FIG. 2 illustrates an example scenario in which an application may synchronize views during document presentation according to embodiments. Diagram 200 displays an example application synchronizing an attendee view 204 to presenter view 206 while presenting a document using an offset ratio calculation.

According to some embodiments, the application may determine an offset for the content (e.g., text) displayed in the presenter view. The application may determine a top distance 210 of a top edge of the presenter view from a top edge of a top page 1 (202) of the text shown by the presenter view 206. The application may divide the top distance 210 with a length of the top page 1 (202) to calculate the offset. Next, the application may shift the text displayed in the attendee view according to the offset. The application may shift the text by moving a top edge of the attendee view 204 to a distance calculated by multiplying the offset with the length of the top page 1 (202) as displayed by the attendee view 204. The attendee view 204 may increase or decrease the length of the top page 1 (202) to fit the text of the document into the attendee view 204. In another example, the presenter may be at the middle of page 2, the offset may be computed as 50% with reference to page 2, instead of page 1.

According to other embodiments, the application may determine an offset using a bottom page 2 (208). The application may determine a bottom distance of a bottom edge of the bottom page 2 (208) of the text shown by the presenter view 206. The application may divide the bottom distance with a length of the bottom page 2 (208) to calculate the offset. Next, the application may shift the text displayed by the attendee view 204 according to the offset. The application may shift the text by moving a bottom edge of the attendee view 204 to a distance calculated by multiplying the offset with the length of the bottom page 2 (208). The attendee view 204 may increase or decrease the length of the bottom page 2 (208) to fit the text of the document into the attendee view 204.

While top, bottom, and middle alignments are described herein, embodiments are not limited to aligning displayed content to top, middle, or bottom only. Other reference points such as a predefined percentage from top, middle, bottom, or any other location on a page (or canvas) may be used to align content in attendee view. The top, bottom, as well as, left/right alignments may be used in some example embodiments to ensure that the attendee client shows at least those areas.

Figure 3:
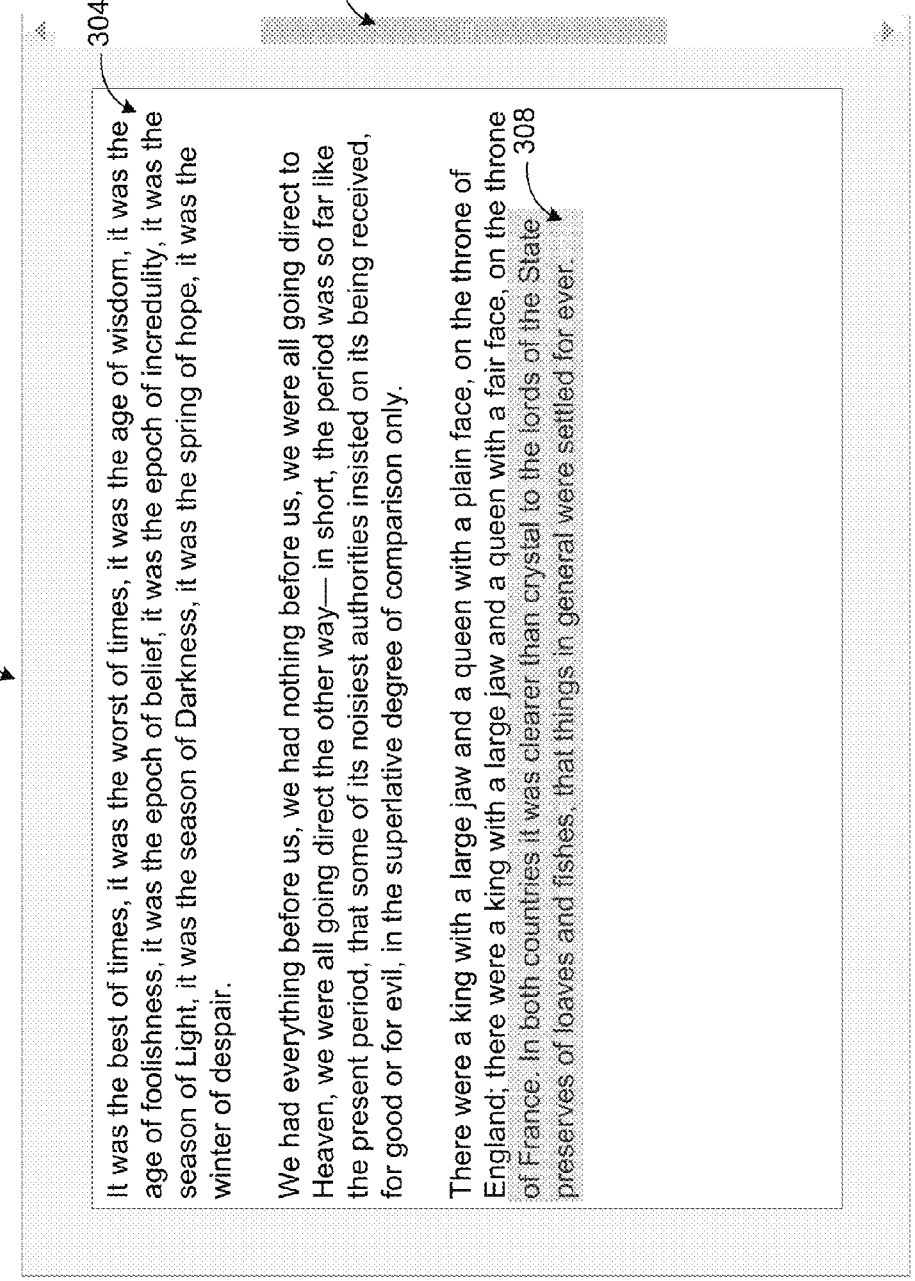
FIG. 3 illustrates a selection based example scenario in which an application may synchronize views during document presentation according to embodiments.

FIG. 3 illustrates a selection based example scenario in which an application may synchronize views during document presentation according to embodiments. Diagram 300 displays a presenter view 302 in which a presenter brings a selection 308 from text 304 into focus by selecting a portion of the text 304.

According to some embodiments, a presenter may bring to focus a selection from the text displayed by the presenter view 302 through a selection action. Alternatively, the application may detect other presenter actions such as the presenter pointing to a region of the text to determine a selection. The presenter view 302 may also be scrollable 306 to display different areas of the text within a document.

Figure 4:
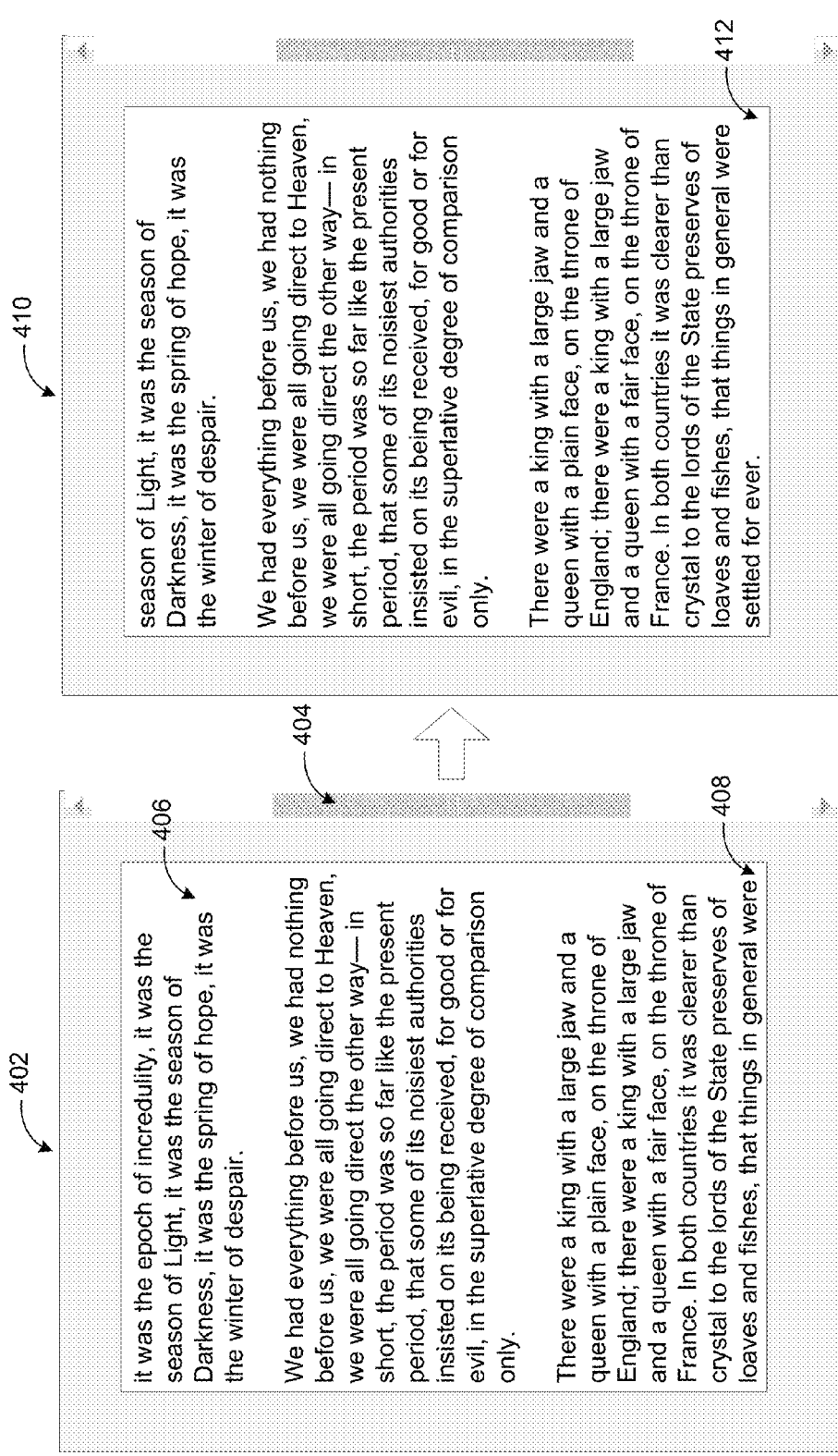
FIG. 4 illustrates another selection based example scenario in which an application may synchronize views during document presentation according to embodiments.

FIG. 4 illustrates another selection based example scenario in which an application may synchronize views during document presentation according to embodiments. Diagram 400 may display an application synchronizing an attendee view 402 to bring to focus a selection in focus in the presenter view.

According to some embodiments, the attendee view may display text 406 from a document. The view may be scrollable 404 to move between sections of the text. The attendee view 402 may be out of synch 408 with the selection in focus in the presenter view. Upon detecting the selection at the presenter view, the application may move the text to bring to focus the selection 412 in adjusted attendee view 410.

According to another embodiment, the application may determine the location of the selection from a top, a middle or a bottom section of the presenter view. The application may shift the text displayed in the attendee view to position the selection at a top section of the attendee view subsequent to detecting the location of the selection in the top section of the presenter view. Additionally, the application may shift the text displayed in the attendee view to position the selection at a middle section of the attendee view subsequent to detecting the location of the selection in the middle section of the presenter view. Furthermore, the application may shift the text displayed in the attendee view to position the selection at a bottom section of the attendee view subsequent to detecting the location of the selection in the bottom section of the presenter view.

According to yet another embodiment, the application may shift the text displayed in the attendee view to position the selection at a location in the attendee view relative to a location in the presenter view.

Figure 5:
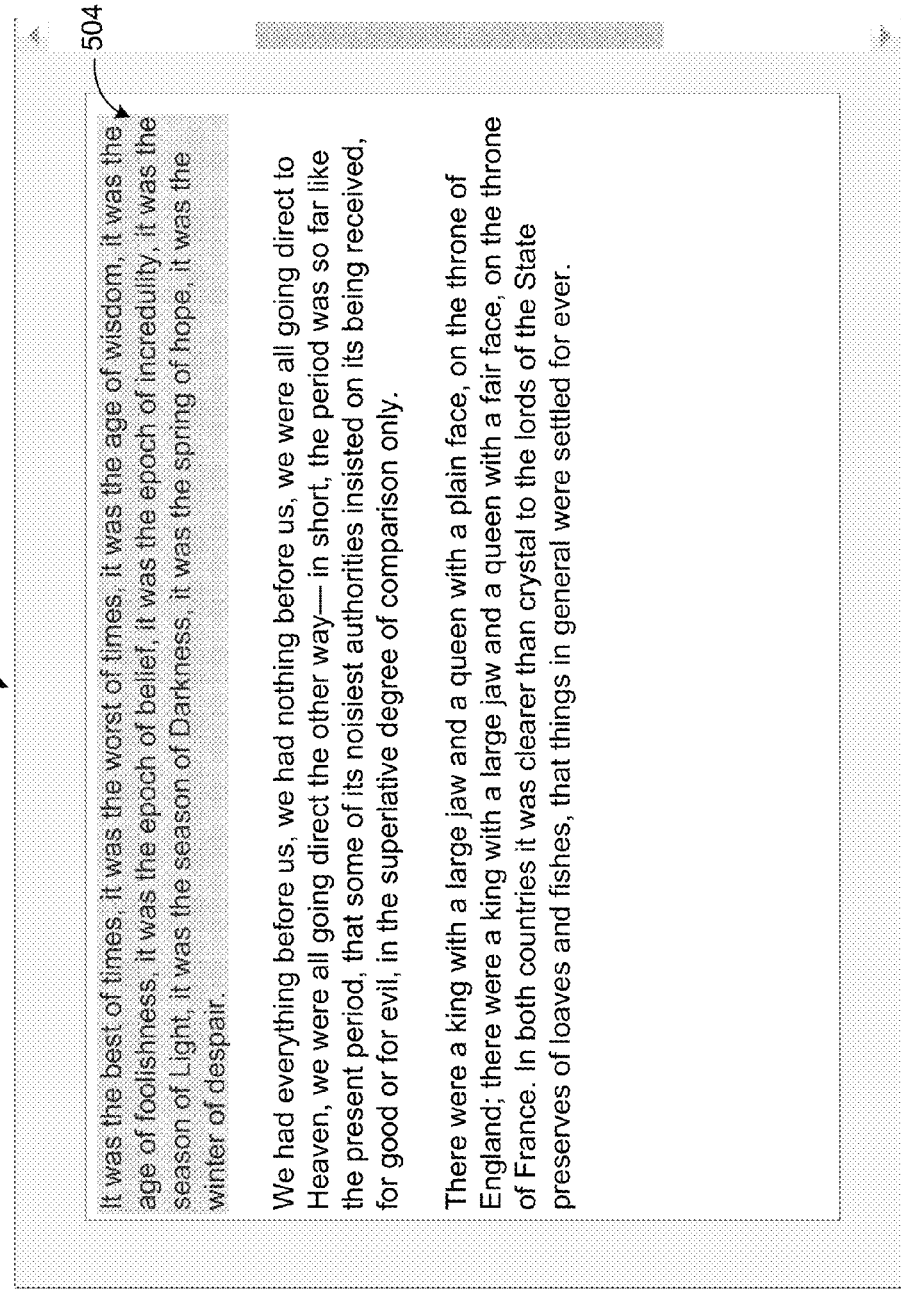
FIG. 5 illustrates a pop-out view pane based example scenario in which an application may synchronize views during document presentation according to embodiments.

FIG. 5 illustrates a pop-out view pane based example scenario in which an application may synchronize views during document presentation according to embodiments. Display 500 may show a presenter view 502. The presenter view 502 may display text from a document. The application may detect a presenter selecting a selection 504.

Figure 6:
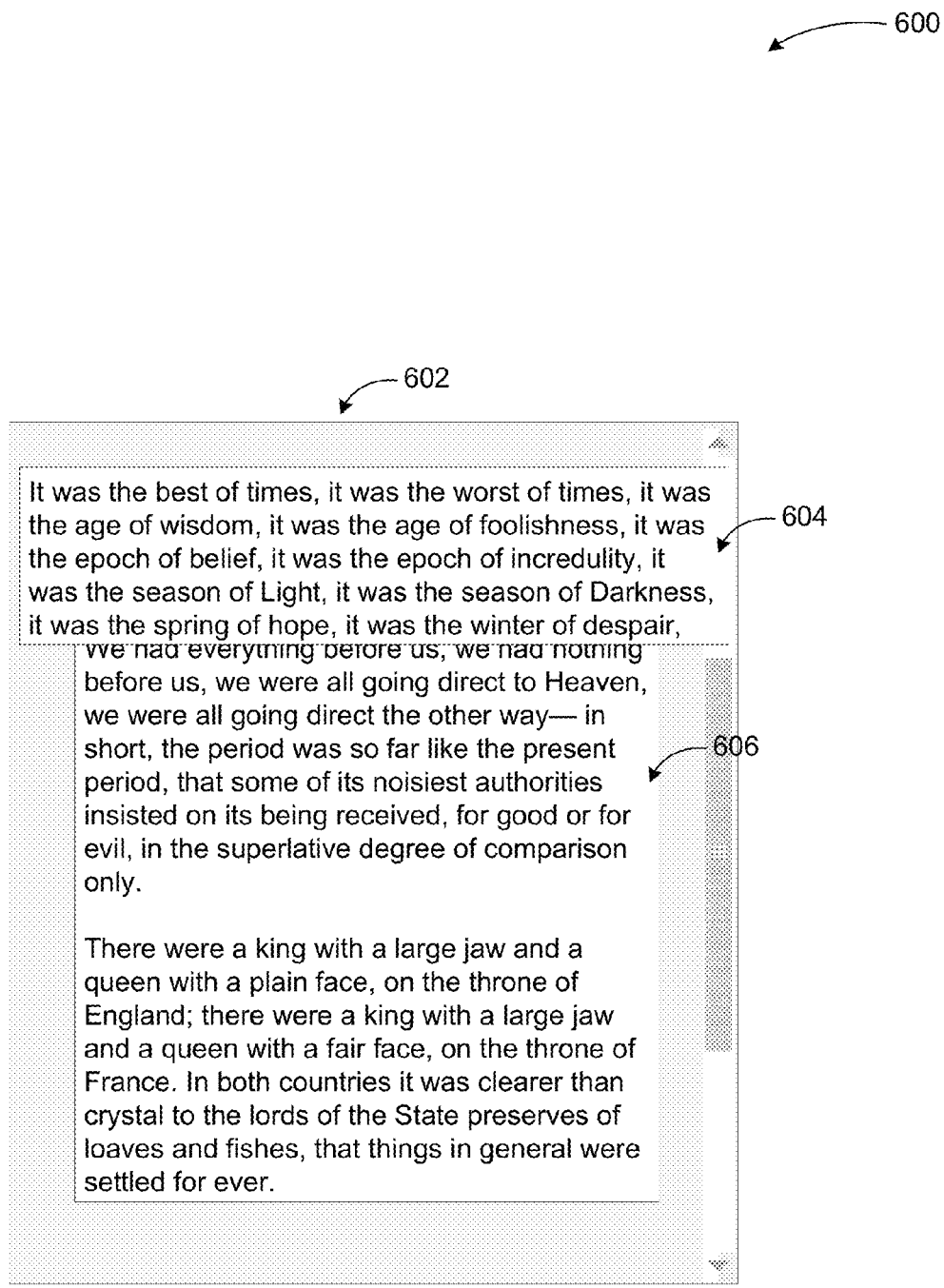
FIG. 6 illustrates another pop-out view pane based example scenario in which an application may synchronize views during document presentation.

FIG. 6 illustrates another pop-out view pane based example scenario in which an application may synchronize views during document presentation. Diagram 600 may display an attendee view bringing to focus a selection using a pop-out view pane 604.

According to some embodiments, the application may bring to focus the selection from the presenter view by displaying a pop-out view pane 604 containing the selection. The remaining text 606 may be displayed within the attendee view underneath the pop-out view pane. The application may present the selection in the pop-out view pane 604 using a zoom factor for the text displayed in the presenter view to emphasize the selection. Alternatively, the application may adjust zoom factor of the selection to fill the pop-out view pane 604 with the selection. An example may include a pop-out view pane 604 resizable by a user which dynamically adjusts the zoom factor of the selection to proportionally encompass the selection within the pop-out view pane 604.

According to other embodiments, the application may decrease the zoom factor of the text displayed in the attendee view to emphasize the selection in the pop-out view pane. In example scenario, the application may make the zoom factor smaller to enforce the attendee to focus on the selection in the pop-out view pane. Additionally, the application may adjust the zoom factor of the text to fit the text displayed in the presenter view into the attendee view. In an example scenario, the application may duplicate the contents of the presenter view by adjusting the zoom factor of the attendee view to fit the entire text in the presenter view into the attendee view.

According to yet other embodiments, the application may retrieve the document from a document store. Additionally, the application may be a web application executed through a web browser while synchronizing the attendee view. Alternatively, the application may synchronize the attendee view using a local application including a document processing application, a slide presenting application, etc. Furthermore, the application may receive the text for the attendee view from a server application hosting the presenter view, a peer-to-peer application hosting the presenter view, etc. In addition to textual content zoom factor adjustment or focus adjustment may be implemented on graphical or image content, as well as, video content.

According to other embodiments, the application may be executed in a touch enabled device such as a tablet, a smartphone, etc. The application may detect presenter actions such as touch and gesture combinations on the display surface of the touch enabled device controlling the document presentation. The application may determine the presenter actions and synchronize the attendee view according to the determination. The presenter actions may include touch and gesture input, as well as other forms of input such as voice commands, inertia-based input, and comparable ones.

The example scenarios and schemas in FIG. 2 through 6 are shown with specific components, data types, content, and configurations. Embodiments are not limited to systems according to these example configurations. Synchronizing views during document presentation may be implemented in configurations employing fewer or additional components in applications and user interfaces. For example, synchronized views of a document according to embodiments may include text, graphics, images, embedded objects, video, and similar content. Synchronization may be performed on any of those contents. Furthermore, the example schema and components discussed in conjunction with FIG. 2 through 6 and their subcomponents may be implemented in a similar manner with other values using the principles described herein.

Figure 7:
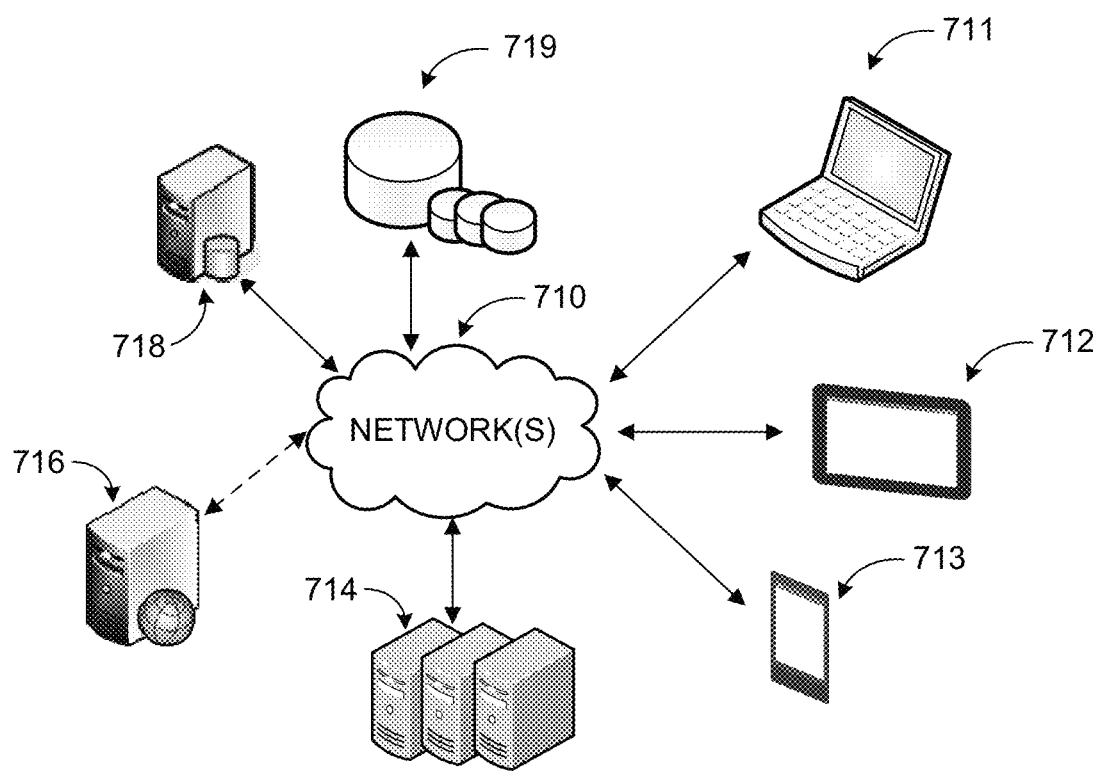
FIG. 7 is a networked environment, where a system according to embodiments may be implemented.

FIG. 7 is a networked environment, where a system according to embodiments may be implemented. Local and remote resources may be provided by one or more servers 714 or a single server (e.g. web server) 716 such as a hosted service. An application may communicate with client interfaces on individual computing devices such as a laptop 711, a tablet device 712 or a smart phone 713 ('client devices') through network(s) 710.

As discussed above, an application may synchronize views during document presentation. The application may synchronize a presenter view to an attendee view using a page offset ratio. Alternatively, the application may synchronize a selection in the presenter view by shifting text in the attendee view to bring to focus the selection or by emphasizing the selection by placing the selection in a pop-out view pane in the attendee view. Client devices 711-713 may enable access to applications executed on remote server(s) (e.g. one of servers 714) as discussed previously. The server(s) may retrieve or store relevant data from/to data store(s) 719 directly or through database server 718.

Network(s) 710 may comprise any topology of servers, clients, Internet service providers, and communication media. A system according to embodiments may have a static or dynamic topology. Network(s) 710 may include secure networks such as an enterprise network, an unsecure network such as a wireless open network, or the Internet. Network(s) 710 may also coordinate communication over other networks such as Public Switched Telephone Network (PSTN) or cellular networks. Furthermore, network(s) 710 may include short range wireless networks such as Bluetooth or similar ones. Network(s) 710 provide communication between the nodes described herein. By way of example, and not limitation, network(s) 710 may include wireless media such as acoustic, RF, infrared and other wireless media.

Many other configurations of computing devices, applications, data sources, and data distribution systems may be employed to synchronize views during a document presentation. Furthermore, the networked environments discussed in FIG. 7 are for illustration purposes only. Embodiments are not limited to the example applications, modules, or processes.

Figure 8:
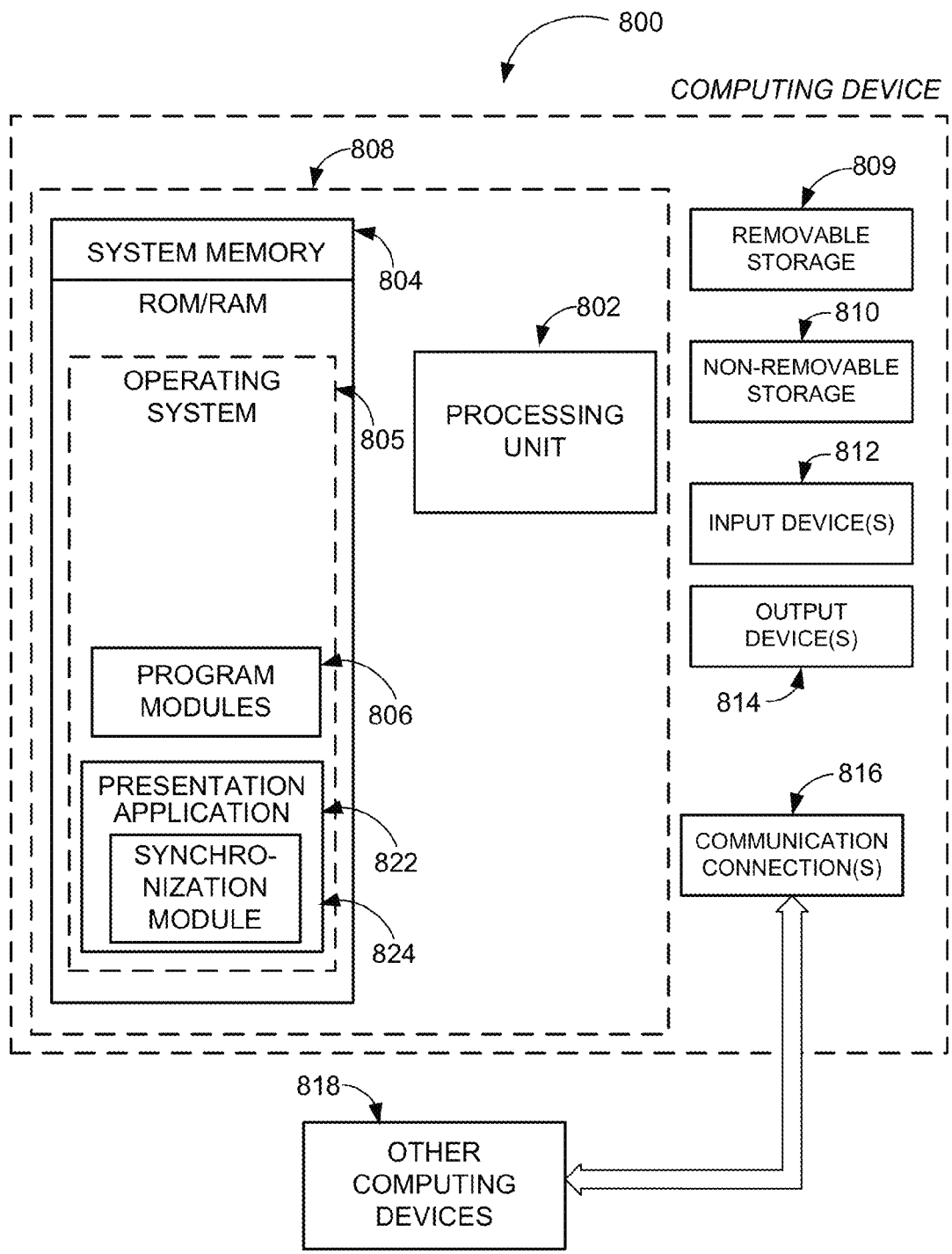
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment for an application according to embodiments is illustrated, such as computing device 800. In a basic configuration, computing device 800 may include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of the platform, such as the WINDOWS® operating systems from MICROSOFT CORPORATION of Redmond, Wash. The system memory 804 may also include one or more software applications such as program modules 806, a presentation application 822, and synchronization module 824.

An application such as a presentation application 822 may synchronize presented documents between presenter and attendee views according to embodiments. The synchronization module 824 may calculate an offset ratio between a non-displayed portion of a document page and a displayed portion of the document page and adjust the attendee view according to the offset ratio. The synchronization module 824 may also synchronize the attendee view by bringing to focus a selection in the presenter view or using a pop-out view pane in the attendee view to display the selection. This basic configuration is illustrated in FIG. 8 by those components within dashed line 808.

Computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer readable storage media may include volatile and nonvolatile, removable and non-removable media implemented in any method or technology for storage of information, such as computer readable instructions, data structures, program modules, or other data. Computer readable storage media is a non-transitory computer readable memory device. System memory 804, removable storage 809 and non-removable storage 810 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer readable storage media may be part of computing device 800. Computing device 800 may also have input device(s) 812 such as keyboard, mouse, pen, voice input device, touch input device, and comparable input devices. Output device(s) 814 such as a display, speakers, printer, and other types of output devices may also be included. These devices are well known in the art and need not be discussed at length here.

Computing device 800 may also contain communication connections 816 that allow the device to communicate with other devices 818, such as over a wireless network in a distributed computing environment, a satellite link, a cellular link, and comparable mechanisms. Other devices 818 may include computer device(s) that execute communication applications, storage servers, and comparable devices. Communication connection(s) 816 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be with a machine that performs a portion of the program.

Figure 9:
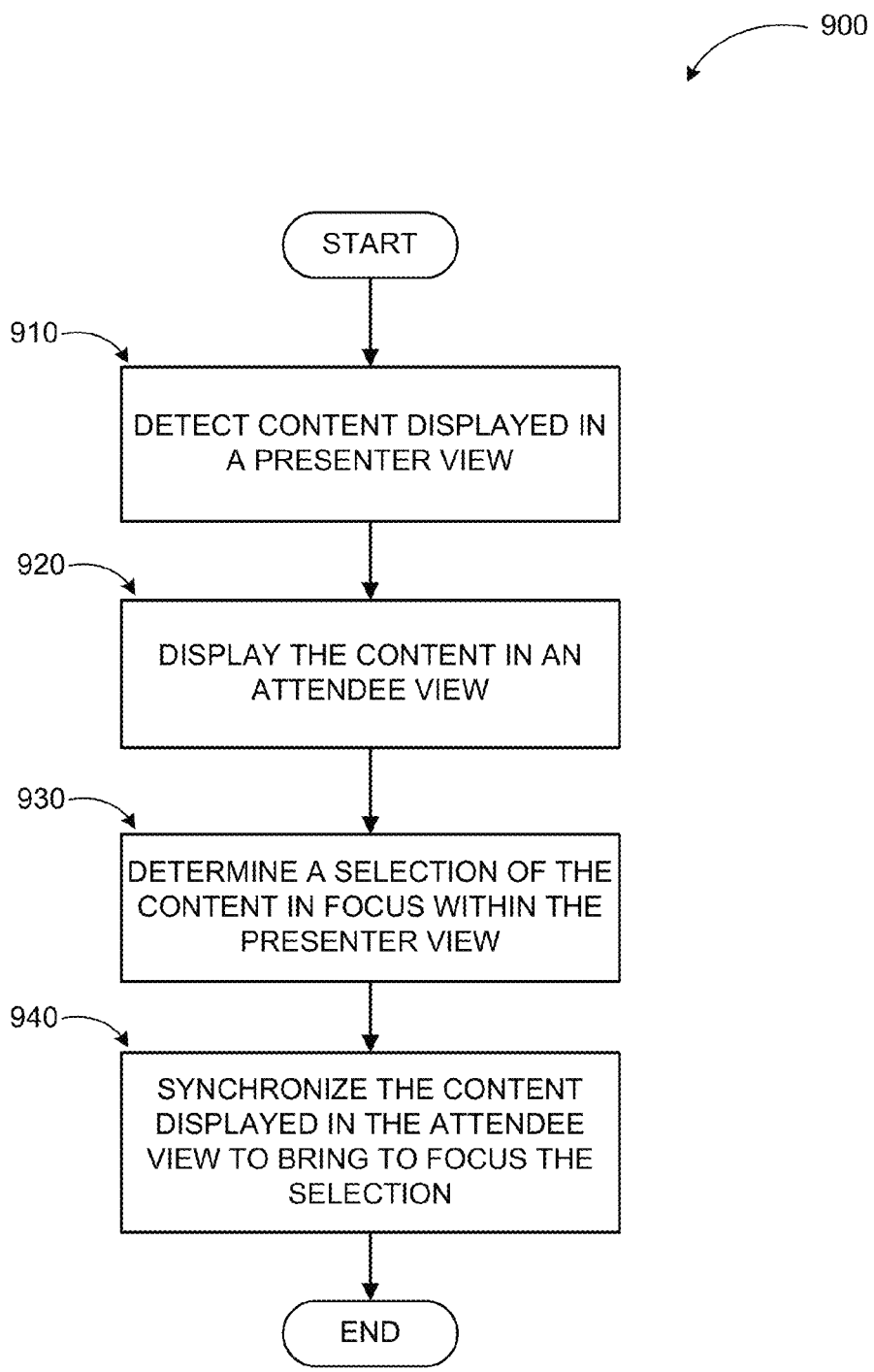
FIG. 9 illustrates a logic flow diagram for a process synchronizing views during document presentation according to embodiments.

FIG. 9 illustrates a logic flow diagram for a process synchronizing views during document presentation according to embodiments. Process 900 may be implemented by an application such as a presentation application employing a synchronization module to synchronize an attendee view to a presenter view in some examples.

Process 900 may begin with operation 910 where an application may detect text from a document displayed in a presenter view. The document may contain additional content such as audio, video, and images. The application may display the text in an attendee view at operation 920. The attendee view may be provided by a document processing application. Subsequently, the application may determine a selection of the text in focus in the presenter view at operation 930. The application may detect a presenter selecting a section of the text or pointing to a section of the text. At operation 940, the application may synchronize the text displayed in the attendee view to bring to focus the selection.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 900 are for illustration purposes. Synchronizing views during document presentation according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not ily limited to the specific features or acts described above. Rather, the specific features and acts described above are disclosed as example forms of implementing the claims and embodiments.

What is claimed is:

1. A method executed on a computing device for synchronizing views during document presentation, the method comprising:
    detecting content from a document displayed in a presenter view;
    displaying the content in an attendee view;
    determining a selection of a portion of the content in the presenter view;
    synchronizing the content displayed in the attendee view by displaying the selection in a pop-out view pane in the attendee view, wherein remaining content in the attendee view is displayed underneath the pop-out view pane; and
    increasing a zoom factor of the selection in the pop-out view pane, and decreasing the zoom factor of the remaining content displayed in the attendee view to bring focus to the selection.

2. The method of claim 1, further comprising:
    determining a location of the selection in a predefined section of the presenter view.

3. The method of claim 2, further comprising:
    shifting the content displayed in the attendee view to position the selection at a first section of the attendee view subsequent to detecting the location of the selection in a corresponding first section of the presenter view;
    shifting the content displayed in the attendee view to position the selection at a second section of the attendee view subsequent to detecting the location of the selection in a corresponding second section of the presenter view; and
    shifting the content displayed in the attendee view to position the selection at a third section of the attendee view subsequent to detecting the location of the selection in a corresponding third section of the presenter view.

4. The method of claim 3, further comprising:
    selecting the position in the attendee view based on a location of the predefined section in the presenter view with reference to one of: a top, a bottom, a middle, a left, a right, and a predefined reference location of the presenter view.

5. The method of claim 1, further comprising:
    presenting the selection in the attendee view selecting an object size for an object in the selection such that focus is brought to the selection depending on a type of the object.

6. The method of claim 5, further comprising:
    selecting one of the zoom factor and a font size for textual objects and the zoom factor for graphical objects.

7. The method of claim 5, further comprising:
    adjusting the object size selection such that an available display area in the attendee view is filled.

8. The method of claim 5, further comprising:
    decreasing the object size of the object within the content displayed in the attendee view to emphasize the selection in a pop-out view pane.

9. The method of claim 5, further comprising:
    selecting different object sizes for different object types in the content displayed in the attendee view.

10. The method of claim 1, further comprising:
    detecting content from the document displayed in the presenter view and synchronizing the content displayed in the attendee view to bring to focus the selection at a hosted application managing a presentation of the document to one or more attendees.

11. The method of claim 10, further comprising:
    enabling access to the hosted application through a presenter client displaying the presenter view and one or more attendee client displaying the attendee views, wherein users are enabled to interact with the presenter client and the attendee clients through at least one from a set of: a mouse input, a keyboard input, a touch input, a gesture input, a voice input, and an inertia-based input.

12. A computing device for synchronizing views during document presentation, the computing device comprising:
    a memory device configured to store instructions; and
    a processor implemented in hardware coupled to the memory device, the processor executing an application in conjunction with the instructions stored in the memory device, wherein the application is configured to:
        detect content from a document displayed in a presenter view;
        display the content in an attendee view;
        determine an offset for the content displayed in the presenter view;
        shift the content displayed in the attendee view according to the offset;
        determine a selection of a portion of the content in the presenter view;
        synchronize the content displayed in the attendee view by displaying the selection in a pop-out view pane in the attendee view, wherein remaining content in the attendee view is displayed underneath the pop-out view pane; and
        increase a zoom factor of the selection in the pop-out view pane, and decrease the zoom factor of the remaining content displayed in the attendee view to bring focus to the selection.

13. The computing device of claim 12, wherein the application is further configured to:
    determine a top distance of a top edge of the presenter view from a top edge of a top page of the content shown by the presenter view; and
    divide the top distance with a length of the top page to calculate the offset.

14. The computing device of claim 13, wherein the application is further configured to:
    move a top edge of the attendee view to a distance calculated by multiplying the offset with the length of the top page.

15. The computing device of claim 12, wherein the application is further configured to:
    determine a bottom distance of a bottom edge of the presenter view from a bottom edge of a bottom page of the content shown by the presenter view; and
    divide the bottom distance with a length of the bottom page to calculate the offset.

16. The computing device of claim 15, wherein the application is further configured to:
    move a bottom edge of the attendee view to a distance calculated by multiplying the offset with the length of the bottom page.

17. The computing device of claim 12, wherein the application is one of: a hosted presentation application managing the presentation view and one or more attendee views and a local document processing application receiving information associated with the presented document from a remote presentation application.

18. A computer-readable memory device with instructions stored thereon for synchronizing views during document presentation, the instructions comprising:

detecting content from a document displayed in a presenter view;

displaying the content in an attendee view;

determining a selection of a portion of the content in the presenter view; and synchronizing the content displayed in the attendee view to bring to focus the selection by:
- shifting the content displayed in the attendee view to position the selection at a location in the attendee view relative to the a location in the presenter view,
- displaying the selection in a pop-out view pane at the location in the attendee view, wherein remaining content in the attendee view is displayed underneath the pop-out view pane, and
- increasing a zoom factor of the selection in the pop-out view pane, and decreasing the zoom factor of the remaining content displayed in the attendee view.

19. The computer-readable memory device of claim 18, wherein the instructions further comprise:

retrieving the document from a document store; and synchronizing the attendee view using a web application executed through a web browser.

20. The computer-readable memory device of claim 18, wherein the content includes at least one from a set of: text, a graphic, an image, an embedded audio object, and an embedded video object.

* * * * *